(12) United States Patent
Kim et al.

(10) Patent No.: US 9,575,582 B2
(45) Date of Patent: Feb. 21, 2017

(54) METHOD AND APPARATUS FOR PROCESSING TOUCH INPUT IN MOBILE TERMINAL

(71) Applicant: Samsung Electronics Co., Ltd., Gyeonggi-do (KR)

(72) Inventors: Gi-Beom Kim, Gyeonggi-do (KR); Hyuk Kang, Gyeonggi-do (KR); Hyeong Seok Kim, Seoul (KR); Hyun Chul Choi, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/282,632

(22) Filed: May 20, 2014

(65) Prior Publication Data
US 2014/0340309 A1  Nov. 20, 2014

(30) Foreign Application Priority Data
May 20, 2013  (KR) .......................... 10-2013-0056421

(51) Int. Cl.
*G06F 3/041*  (2006.01)
*G06F 3/14*  (2006.01)
*G06F 3/01*  (2006.01)

(52) U.S. Cl.
CPC .............. *G06F 3/041* (2013.01); *G06F 3/017* (2013.01); *G06F 3/1423* (2013.01); *G06F 3/1438* (2013.01); *G09G 2370/10* (2013.01); *G09G 2370/12* (2013.01); *G09G 2370/16* (2013.01)

(58) Field of Classification Search
CPC ....................................... G06F 3/041–3/04897
See application file for complete search history.

(56) References Cited

U.S. PATENT DOCUMENTS

| 2006/0142970 | A1* | 6/2006 | Sachs ...................... G06F 3/044 702/150 |
| 2008/0109763 | A1 | 5/2008 | Lee |
| 2011/0227845 | A1* | 9/2011 | Lin ........................ G06F 3/0485 345/173 |
| 2012/0040719 | A1* | 2/2012 | Lee et al. ........................ 455/557 |
| 2012/0127206 | A1* | 5/2012 | Thompson et al. .......... 345/661 |
| 2012/0212420 | A1 | 8/2012 | Shin |
| 2014/0225829 | A1* | 8/2014 | Miyazaki .............. G06F 3/0488 345/157 |
| 2014/0289665 | A1* | 9/2014 | Sugiura et al. ................ 715/778 |

FOREIGN PATENT DOCUMENTS

| KR | 1020080040930 | 5/2008 |
| KR | 1020110024164 | 3/2011 |
| KR | 1020110039929 | 4/2011 |

* cited by examiner

*Primary Examiner* — Gene W Lee
(74) *Attorney, Agent, or Firm* — The Farrell Law Firm, P.C.

(57) ABSTRACT

Disclosed are an apparatus and a method for processing a touch input in the mobile terminal. The method includes transmitting information displayed in the mobile terminal to an external display device when connected to the external display device through a wired or wireless interface, receiving a first input, identifying a holding time of the first input when receiving a second input following the first input, and processing the second input according to the holding time of the identified first input. Accordingly, the touch input is analyzed and a subsequent drag input is performed as a pointer movement or a scroll operation in accordance with a holding time of the touch input, so that a user can conveniently select a desired item.

12 Claims, 8 Drawing Sheets

METHOD AND APPARATUS FOR PROCESSING TOUCH INPUT IN MOBILE TERMINAL

PRIORITY

This application claims priority under 35 U.S.C. §119(a) to Korean Patent Application No. 10-2013-0056421, filed on May 20, 2013, the contents of which are incorporated herein by reference.

BACKGROUND OF THE INVENTION

1. Field of the Invention

The present invention relates generally to a mobile terminal, and more particularly, to an apparatus and a method for processing a touch input in a mobile terminal.

2. Description of the Related Art

The mobile terminal has evolved into a multi-media device that can provide various functions such as electronic scheduler, game, and scheduler management functions. This evolution has required a user interface that can conveniently manage and use the various additional functions.

When a touch and a drag operation (flick) is performed, the mobile terminal equipped with a touch screen including a conventional touch panel performs a scroll function or a function of moving an item selected by a touch.

A technology for displaying information displayed in the mobile terminal in an external display device through a method such as Wireless Fidelity (WiFi), therefore, has been developed. With this technology, a user can control a screen displayed in the external display device using the mobile terminal. However, a user experiences an inconvenient screen control in the prior art. As such, there is a need in the art for an improved method of controlling a screen of the external display device using the mobile terminal.

SUMMARY OF THE INVENTION

The present invention has been developed to solve the foregoing problems in the prior art, and an aspect of the present invention is to provide a method and an apparatus for processing a touch input in a mobile terminal for controlling a screen of an external display device through the mobile terminal.

When a touch input and a drag input are generated in a mobile terminal, an aspect of the present invention is to provide an apparatus and a method for switching a screen or easily selecting a desired item by processing the drag input as a scroll input and a pointer display input, according to a holding time of the touch input.

In accordance with an aspect of the present invention, there is provided a method of processing an input of a mobile terminal, including transmitting information displayed in the mobile terminal to an external display device when connected to the external display device through a wired or wireless interface, receiving a first input, identifying a holding time of a first input when receiving a second input following the first input, and processing the second input according to the holding time of the identified first input.

In accordance with another aspect of the present invention, there is provided a mobile terminal for processing a received input, including a display unit, a input unit configured to receive a user input, an interface unit configured to transmit information displayed in the display unit to an external display device, and a controller configured to control to transmit information displayed in the display unit to the external display device, detect a reception of a first input, identify the holding time of the first input when detecting a reception of a second input following the first input, and process the second input according to the holding time of the identified first input when connected to the external display device through the interface unit.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF THE EMBODIMENTS

Embodiments of the present invention will be described in detail with reference to the accompanying drawings. The same elements will be designated by the same reference numerals although they are shown in different drawings. A detailed description of known functions and configurations incorporated herein will be omitted as it may make the subject matter of the present invention rather unclear.

Figure 1:
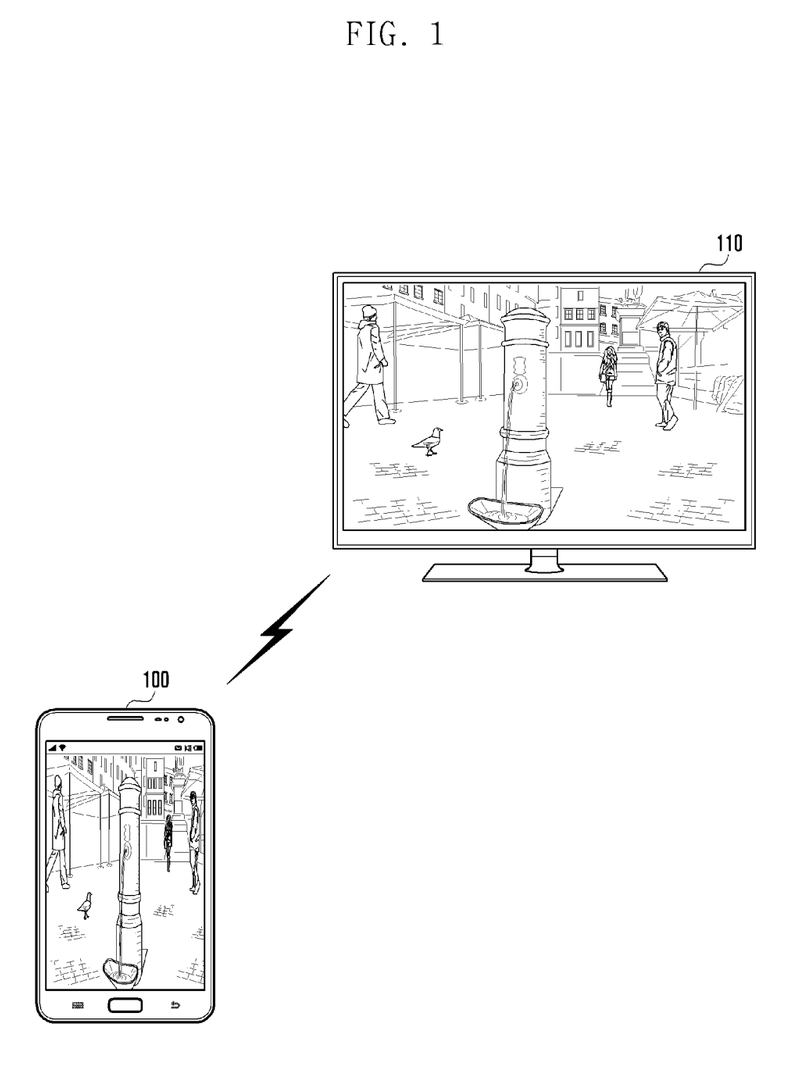
FIG. 1 illustrates a mobile terminal 100 and an external display device 110 wire or wirelessly connected to the mobile terminal by wire or wireless, according to an embodiment of the present invention.

FIG. 1 illustrates a mobile terminal 100 and an external display device 110 wire or wirelessly connected to the mobile terminal according to an embodiment of the present invention.

Referring to FIG. 1, the mobile terminal 100, such as a smart phone or a tablet, displays an item or contents and then executes the item or the contents according to a user command. The mobile terminal 100 may be wire or wirelessly connected to an external display device 110.

The mobile terminal 100 may be wire connected to the external display device 110 through a cable such as a High Definition Multimedia Interface (HDMI), a Red, Green Blue (RGB), a composite, or a component cable. Otherwise, the mobile terminal 100 may be wirelessly connected to the external display device 110 through a wireless communication or a short range communication such as WiFi, Bluetooth®, or Near Field Communication (NFC).

An embodiment of the present invention will be described by assuming a case in which the mobile terminal 100 is connected to the external display device 110 through WiFi.

A technology which causes the mobile terminal 100 to be connected to the external 110 based on WiFi may be referred as to a WiFi display. The WiFi display transmits information displayed in a mobile terminal to a wirelessly connected external display device to the mobile terminal. The external display may refer to a technology of displaying information identical to the information displayed in the mobile terminal.

When the mobile terminal 100 is connected to the external display device 110 through the WiFi display, information displayed on a screen of the mobile terminal 100 may be transmitted to the external display device 110. The mobile terminal 100 may also transmit information of a user input (e.g., a touch or a drag input) received by the mobile terminal 100 to the external display device 110 through the WiFi display technology.

According to the embodiment of the present invention, when a touch and a drag input are generated in the mobile terminal 100, the mobile terminal 100 processes the drag input as a scroll input or a pointer display input according to a holding time of the touch input, and transmits the processed information to the external display device 110. Therefore, a user controls a screen displayed in the external display device 110 through the input of the mobile terminal 100.

Figure 2:
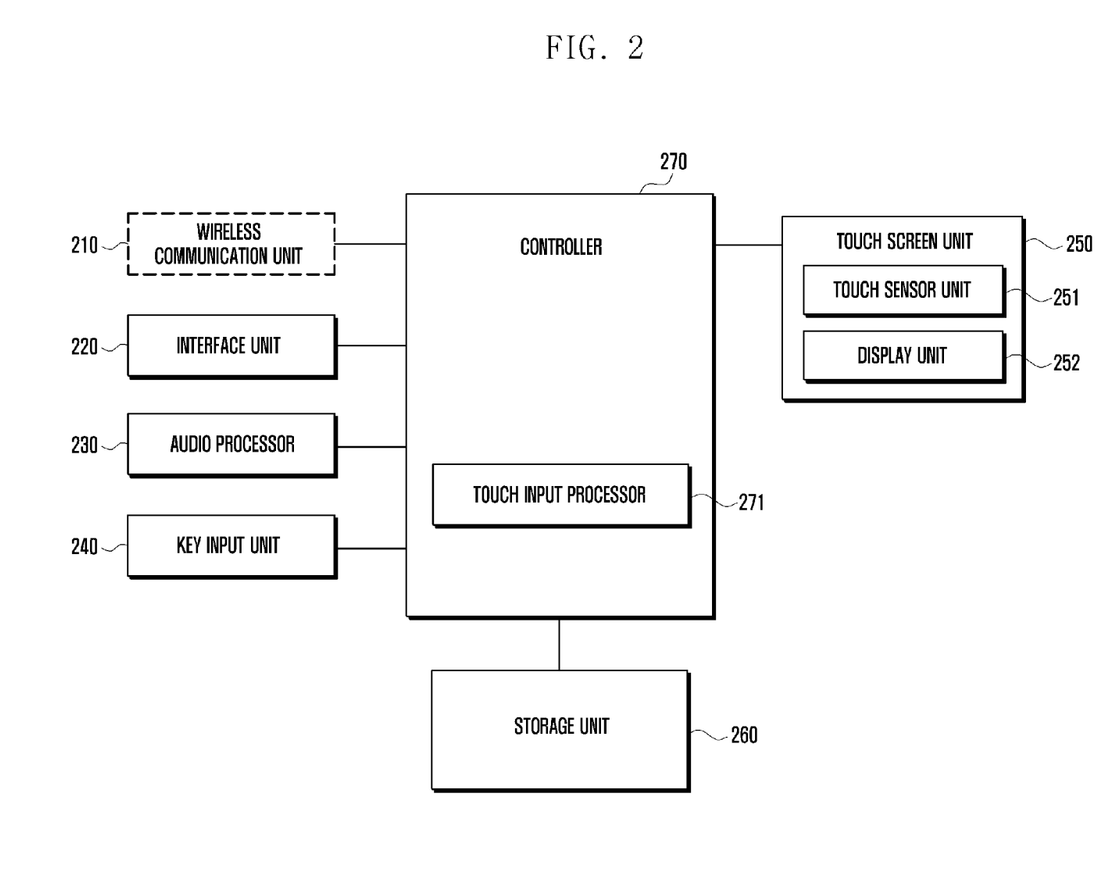
FIG. 2 illustrates an internal structure of a mobile terminal 100 according to an embodiment of the present invention.

FIG. 2 illustrates an internal structure of a mobile terminal 100 according to an embodiment of the present invention. As shown in FIG. 2, the mobile terminal 100 according to the present invention includes a wireless communication unit 210, an interface unit 220, an audio processor 230, a key input unit 240, a touch screen unit 250, a storage unit 260, and a controller 270.

The wireless communication unit 210 transmits and receives corresponding data for wireless communication of the mobile terminal 100. The wireless communication unit 210 includes, for example, a Radio Frequency (RF) transmitter (not shown) for up-converting and amplifying a frequency of a transmitted signal, and an RF receiver (not shown) for low noise amplifying a received signal and down-converting a frequency. The wireless communication unit 210 receives data through a wireless channel, outputs the data to the controller 270, and then transmits the data output from the controller 270 through the wireless channel.

In FIG. 2, since the mobile terminal does not necessarily need to have the wireless communication unit 210, the wireless communication unit 210 is illustrated by a dotted line. For example, when the mobile terminal 100 according to the present invention is a device such as a Motion Pictures Experts Group (MPEG) Layer Audio 3 (MP3) player or a Portable Multimedia Player (PMP), the wireless communication unit 210 is not necessarily required.

The interface unit 220 provides a wired or wireless interface for causing the mobile terminal 100 to be connected to the external display device 110. The wired interface includes a wired connection means such as an HDMI, an RGB, a composite, or a component cable. The wireless interface includes a wireless connection means such as WiFi, Bluetooth®, or Near Field Communication (NFC). In the embodiment of the present invention, it is assumed that the interface unit 220 includes a WiFi module and the mobile terminal 100 is connected and synchronized with the external display device 110 through the WiFi display technology.

The interface unit 220 transmits information displayed on a screen of the mobile terminal 100 and information of a user input (command) received through the mobile terminal 100, to the external display device 110.

The audio processor 230 may be configured as a codec (not shown), which includes a data codec processing packet data, and an audio codec processing an audio signal such as a voice. The audio processor 230 converts a digital audio signal into an analog audio signal through the audio codec and then plays the analog audio signal through a Speaker (SPK). The audio processor 230 converts an analog audio signal input from a Microphone (MIC) into a digital audio signal through the audio codec.

The key input unit 240 (or, input unit) receives a key operating input of a user for controlling the mobile terminal 100, generates an input signal, and then transmits the input signal to the controller 270. The key input unit 240 may be configured as a key pad including numeric and direction keys, and be formed by a function key on one side of the mobile terminal 100. When a mobile terminal is capable of performing all operations using only the touch screen unit 250, the key input unit 240 may be omitted.

The touch screen unit 250 includes a touch sensor unit 251 and a display unit 252. The touch sensor unit 251 detects a touch input of a user, and may be configured as a touch detecting sensor such as a capacitive overlay, a resistive overlay, or an infrared beam, or as a pressure sensor. All types of sensor devices that can detect a connection or a pressure of an object other than the above sensors may be included in the touch sensor unit 251 of the present invention. The touch sensor unit 251 detects a touch input of a user, generates a detection signal, and then transmits the generated detection signal to the controller 270. The detection signal includes coordinate data in which a user inputs a touch. When a user inputs a touch position movement operation, the touch sensor unit 251 generates a detection signal including coordinate data of a touch position moving path, and transmits the generated detection signal to the controller 160.

The display unit 252 may be formed by a Liquid Crystal Display (LCD), Organic Light Emitting Diodes (OLED), or Active Matrix Organic Light Emitting Diodes (AMOLED), for example, and visually provides a menu, input data, function setting information and other various information of the mobile terminal 100 to a user. The display unit 252 performs a function of outputting a boot screen, an idle screen, a menu screen, a telephony screen, and other application screens of the mobile terminal 100.

Even though the mobile terminal 100 of the present invention includes the touch screen as described above, when the present invention is applied to a mobile terminal not including the touch screen, the touch screen unit 250 illustrated in FIG. 2 may be applied by being changed so as to only perform a display unit 252 function.

The storage unit 260 stores a program and data required to operate the mobile terminal 100 and is divided into a program area (not shown) and a data area (not shown). The program area stores a program controlling an overall operation of the mobile terminal 100, an Operating System (OS) for booting up the mobile terminal 100, an application required to play multimedia contents and an application required for other optional functions, such as a camera, an audio play, an image or a video play function of the mobile terminal 100. The data area stores data generated according to use of the mobile terminal 100, and also stores data such as images, video, a phone book, and audio data.

According to the embodiment of the present invention, when a touch input and a drag input are generated in the mobile terminal, the storage unit 260 stores a program for processing the drag input as a scroll input or a pointer display input, according to a holding time of the touch input.

The controller 270 controls an overall operation for each component of the mobile terminal. When a touch input and a drag input are generated in the mobile terminal, the controller 270 controls a series of processes of processing the drag input as a scroll input or a pointer display input according to a holding time of the touch input. To this end, the controller 270 may further include a touch input processor 271.

When detecting a touch input and a drag input, the touch input processor 271 analyzes (i.e., identifies) a time during which the touch input is held. When the time during which the touch input is held is less than a first time, the touch input processor 271 controls a scroll operation to be performed. For example, the touch input processor 271 may transmit a command signal for performing a scroll operation to the external display device 110. When the time during which the touch input is held is greater than or equal to the first time and less than a second time, the touch input processor 271 switches the mobile terminal 100 into a pointer mode, and generates and displays a pointer on the display unit. For example, the touch input processor 271 may transmit a command signal for generating and displaying the pointer to the external display device 110, and may transmit information of a screen on which the pointer is generated to the external display device. When the time during which the touch input is held exceeds the second time, the touch input processor 271 controls a function set in the mobile terminal 100 to be performed. For example, an item corresponding to a position in which the touch input is generated may be executed or a menu corresponding to the item may be displayed.

When an input for a left or right scroll has been received on a screen in which an up or down scroll is only available, the touch input processor 271 according to another embodiment of the present invention controls a pointer to be generated and displayed.

The touch input processor 271 may detect the touch input in a set position or a predetermined position. The touch input processor 271 controls a touch function to be only performed on a screen in which a flick or a panning is unavailable such as a full screen or a pop-up screen.

According to an embodiment of the present invention, the information of the pointer display or the scroll operation is transmitted from the mobile terminal 100 to the external display device 110 through the WiFi display. The external display device 110 displays information identical to information displayed in the mobile terminal 100.

Although it is described that the controller 270 and the touch input processor 271 are configured as separate blocks, each performing a different function, this is only for convenience of description, and functions of block are not necessarily divided as described. For example, it should be noted that the controller 270 may perform a specific function which the touch input processor 271 performs by itself.

Figure 3:
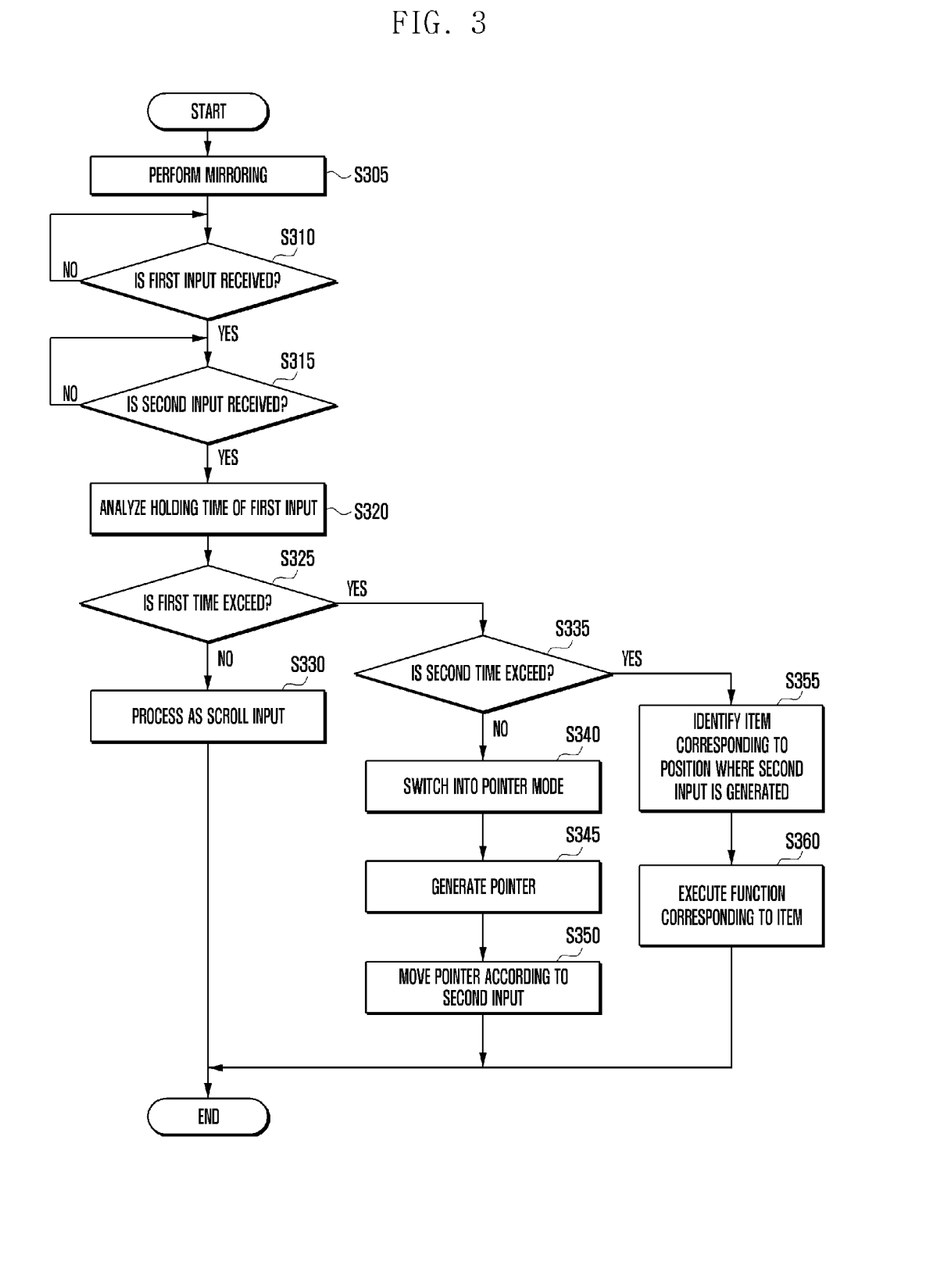
FIG. 3 illustrates a process of processing a touch input according to an embodiment of the present invention.

FIG. 3 illustrates a process of processing a touch input according to an embodiment of the present invention.

In step S305, the controller 270 performs a mirroring which wire or wirelessly connects the mobile terminal 100 and the external display device 110. When connected by wire, the controller 270 controls the mobile terminal 100 to be wire connected to the external display device 110, such as through the HDMI,RGB, or composite cable. In addition, the controller 270 controls the mobile terminal 100 to be wirelessly connected to the external display device 110 through a wireless communication or a short range communication such as WiFi, Bluetooth®, or NFC. The present invention should not be interpreted as being limited to only one of wired mirroring and wireless mirroring.

When the mobile terminal 100 and the external display device 110 are connected to each other by the mirroring, information displayed in the mobile terminal 100 is transmitted to the external display device 110. The information displayed in the mobile terminal 100 may then be displayed in the external display device 110. In this event, both the mobile terminal 100 and the external display device 110 display identical information, or a screen of the mobile terminal 100 is turned off and information to be displayed in the mobile terminal 100 may be displayed on only the external display device 110. The mobile terminal 100 may maintain an input idle state which can receive an input (e.g., a touch input) from a user even though the screen is turned off. Otherwise, the mobile terminal 100 may further display a control means for controlling the external display device 110 other than originally displayed information.

The controller 270 determines whether a first input is received in step S310. In an embodiment of the present invention, it is assumed that the first input is a touch input. The controller 270 determines whether a second input is received following the first input in step S315, when the first input is received. In the embodiment of the present invention, it is assumed that the second input is a drag input.

As described above, when receipt of the first input and the second input is detected, the controller 270 analyzes the time during which the first input is held in step S320. The controller 270 determines whether the time during which the first input is held exceeds the first time in step S325.

When the first time is not exceeded, the controller 270 processes the second input as a scroll input. The controller 270 controls the screen displayed in the mobile terminal 100 to be processed as the scroll input according to the second input so that the screen is displayed by moving or switching. In this event, the controller 270 transmits information of the screen processed as the scroll input to the external display device, which displays the received information. The controller 270 transmits only a command for the scroll input to the external display device 110. Based on a screen displayed on an external display, the external display device 110 may move and switch the screen according to the scroll input command. In step S325, as a result of analyzing the time during which the first input is held, when the first time is exceeded, the controller 270 proceeds to step S335 and determines whether the time during which the first input is held exceeds a second time.

When the second time is not exceeded, the controller 270 proceeds to step S340 and switches a screen control mode of the mobile terminal 100 into a pointer mode. Then the controller 270 proceeds to step S345, generates a pointer in a position in which the second input is held, and displays the pointer. A mark of the pointer may be displayed in both the mobile terminal 100 and the external display device 110. A position in which the pointer is displayed may be a position in which the second input is held or is generated, or a position in which the first input is generated.

The controller 270 then proceeds to step S350 and controls a pointer displayed in the mobile terminal 100 and/or the external display device 110 to be moved and displayed according to the second input. Although not illustrated in the drawings, while moving the pointer, when the second input is released and a third input (e.g. a touch input) is then generated, the controller 270 may process an item corresponding to a position in which a corresponding input is generated to be selected or executed.

In step S335, when the time during which the first input is held exceeds the second time, the controller 270 proceeds to step S355 and identifies an item corresponding to a position in which the second input is generated or the second input is held. The item includes, for example, a text, an image, a video, a widget, or a function execution icon.

The controller 270 then proceeds to step S360 and performs a function corresponding to the identified item, such as displaying a submenu including the item or performing a function set to be performed when setting the item.

When the first input and the second input have been received, the first input and the second input may be processed as different inputs according to the time during which the first input is held. Therefore, when the information displayed in the mobile terminal 100 is displayed in the external display device 110 through the mirroring, a screen of the external display device connected to the mobile terminal may be easily controlled.

Figure 4:
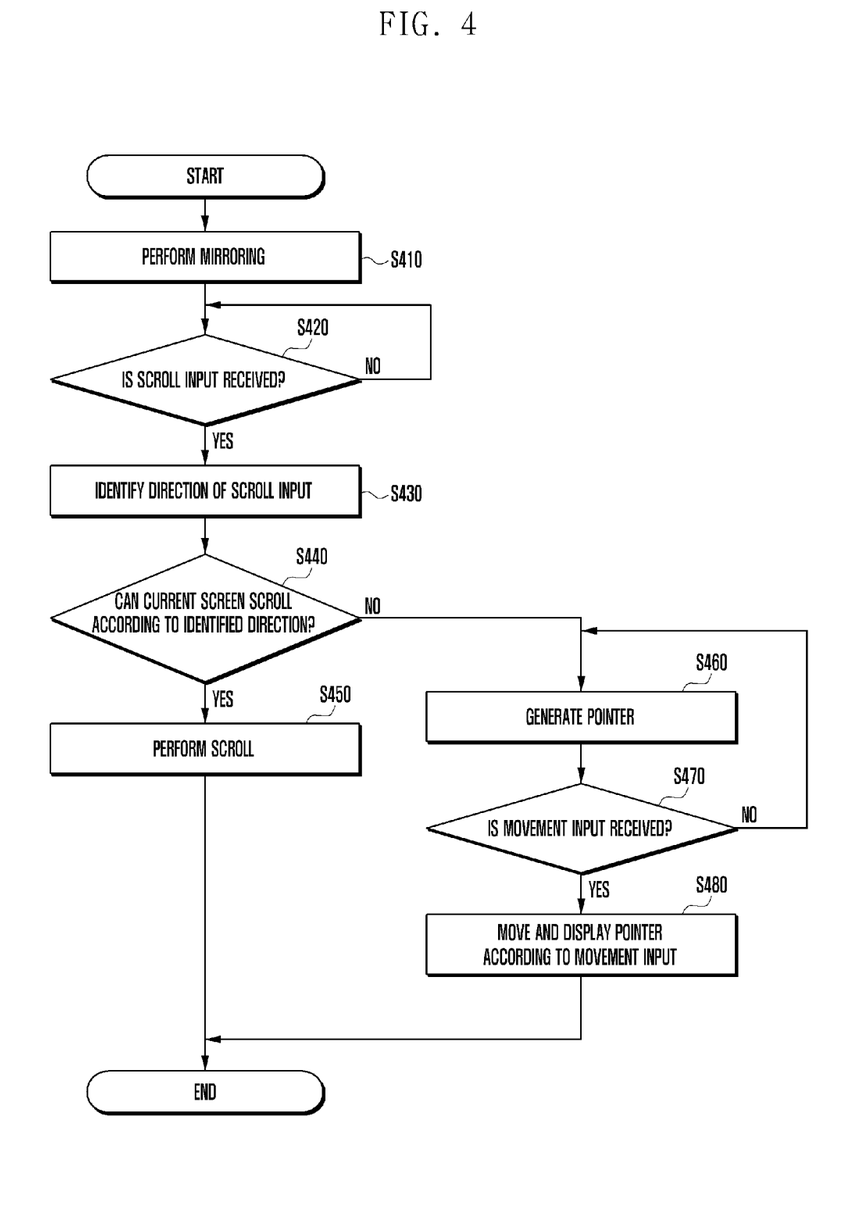
FIG. 4 illustrates a process of processing a touch input according to another embodiment of the present invention.

FIG. 4 illustrates a process of processing a touch input according to another embodiment of the present invention.

In step S410, the controller 270 performs a mirroring which wire or wirelessly connects the mobile terminal 100 and the external display device 110. Since the detailed description has been discussed with regard to performing mirroring in FIG. 3, a further detailed description will be omitted here.

The controller 270 determines whether a scroll input is received in step S420. When the scroll input has been received, the controller 270 proceeds to step S430 and identifies a direction of the scroll input.

The controller 270 determines whether a current screen can scroll depending on an identified direction in step S440. For example, a scroll can only be performed in a vertical direction on a screen (text articles in a web browser) on which items are vertically arranged, and a scroll can be performed in a horizontal direction on a screen (images in a gallery application) on which items are horizontally arranged.

When the current screen can scroll according to the scroll input, the controller 270 proceeds to step S450 and performs a scroll. Therefore, screens displayed in the mobile terminal 100 and the external display device 110 are simultaneously scrolled.

Otherwise, when the current screen cannot scroll according to the scroll input, the controller 270 proceeds to step S460 and controls a pointer to be generated and displayed on a screen. That is, a pointer is displayed in the mobile terminal 100 and the external display device 110.

The controller 270 then proceeds to step S470 and determines whether a movement input is received. When the movement input has been received, the controller 270 proceeds to step S480 and controls a pointer displayed in the mobile terminal 100 and/or the external display device 110 to be moved and displayed according to the movement input.

Figure 5:
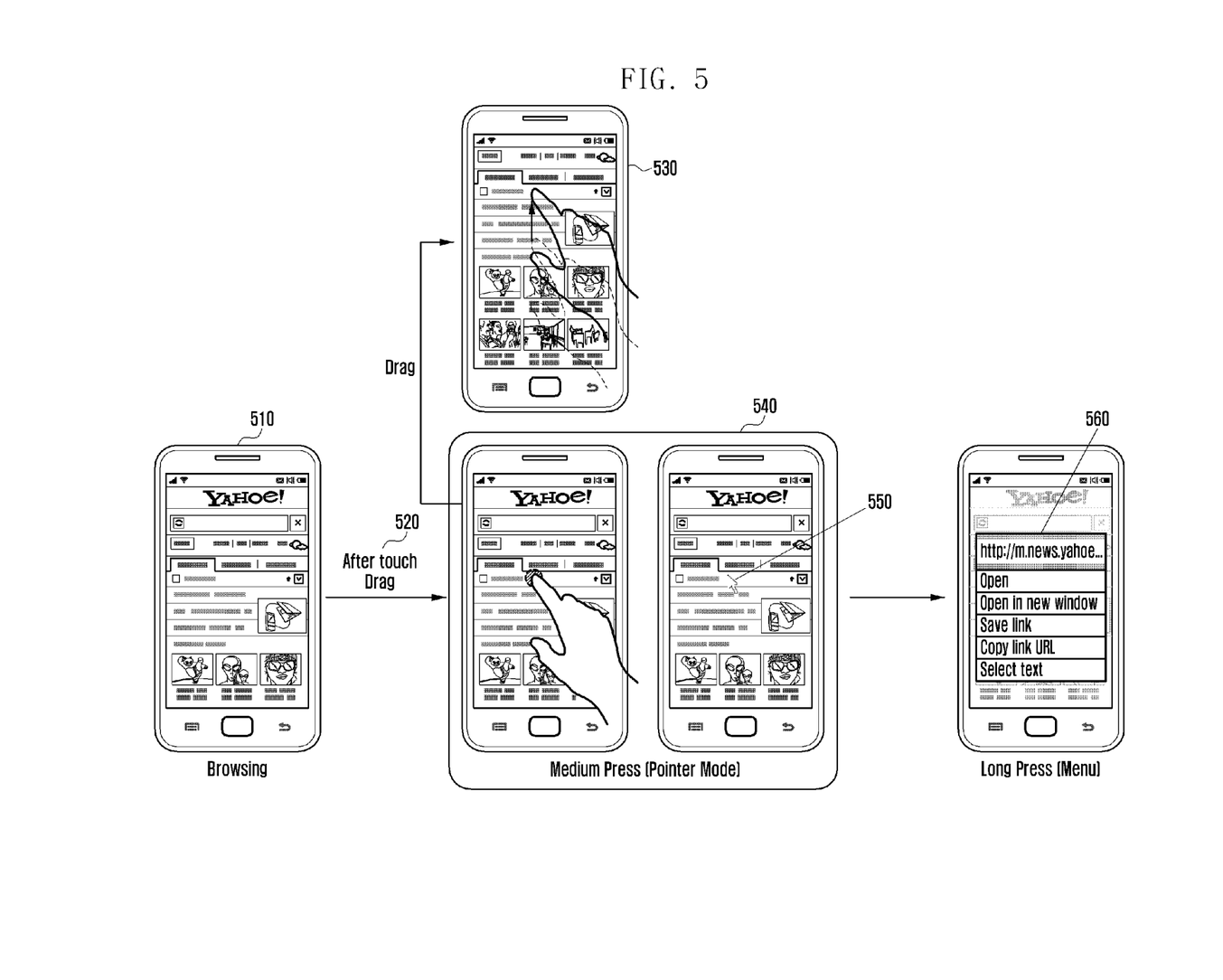
FIG. 5 illustrates an overall operation according to an embodiment of the present invention.

FIG. 5 illustrates an overall operation according to an embodiment of the present invention.

Block 510 illustrates a state in which the mobile terminal 100 and the external display device 110 are connected to each other through a mirroring. A browser screen as shown in block 510 may be displayed in the mobile terminal 100 and/or the external display device 110.

As shown in block 520, a touch input and a drag input following the touch input are generated in a predetermined area in a browser displayed in the mobile terminal 100.

When the time during which the touch input is held is less than the first time, the drag input is processed as a screen scroll command as shown in block 530. Therefore, in block 530, it can be verified that a screen in the browser is scrolled according to a drag input.

Otherwise, when the time during which the touch input is held exceeds the first time and is less than the second time, a screen mode is switched into a pointer mode as shown in block 540. Therefore, a pointer 550 is displayed in the mobile terminal 100 and/or the external display device 110 and the pointer moves according to the drag input.

When the time during which the touch input is held exceeds the second time, a function of an item corresponding to a position where the second input is generated or the second input is held may be performed. Block 560 illustrates an embodiment displaying a submenu of a specific article in a web browser.

Figure 6:
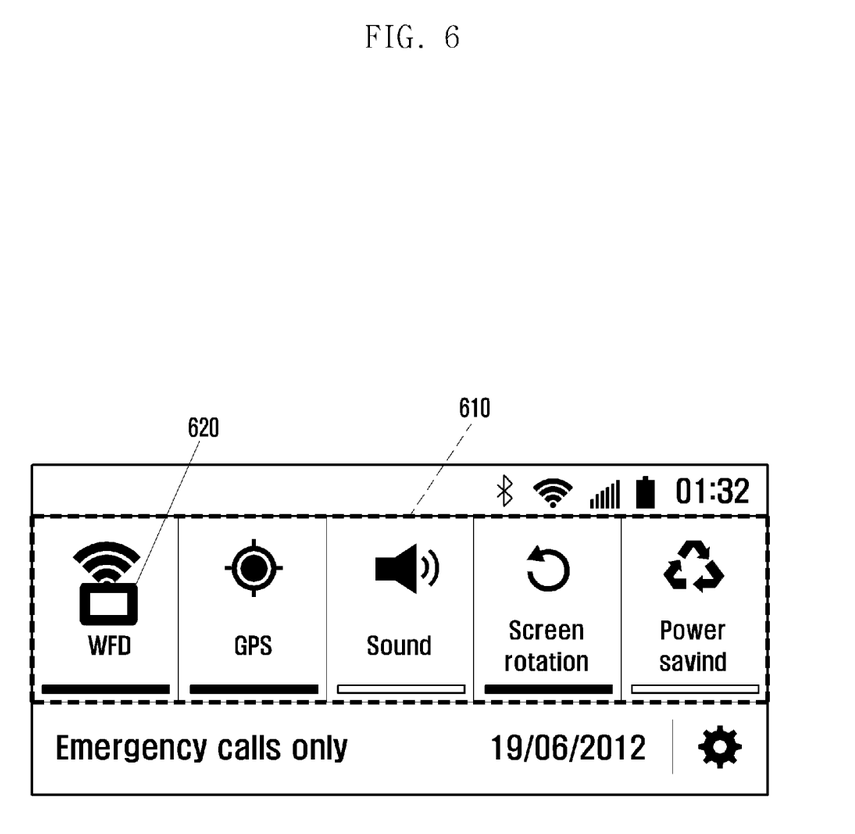
FIG. 6 illustrates a method of switching a mobile terminal into a pointer mode according to another embodiment of the present invention.

FIG. 6 illustrates a method of switching a mobile terminal into a pointer mode according to another embodiment of the present invention.

The mobile terminal 100 according to the embodiment of the present invention includes a quick panel function. The quick panel is displayed in a side of a predetermined area of the mobile terminal, and one or more menus typically used in the mobile terminal 100 are displayed. A user may use a menu included in the quick panel and perform such functions as an execution and on/off of a specific menu.

A pointer mode control menu 620 may be included in a quick panel area 610 and then displayed as shown in FIG. 6. The mobile terminal 100 may be switched into a pointer mode according to whether a user input for the pointer mode control menu 620 is received.

When switching into the pointer mode, a pointer may be generated in a predetermined area of the mobile terminal 100 and/or the external display device 110. The user then controls a movement of the pointer through a selected input.

Figure 7:
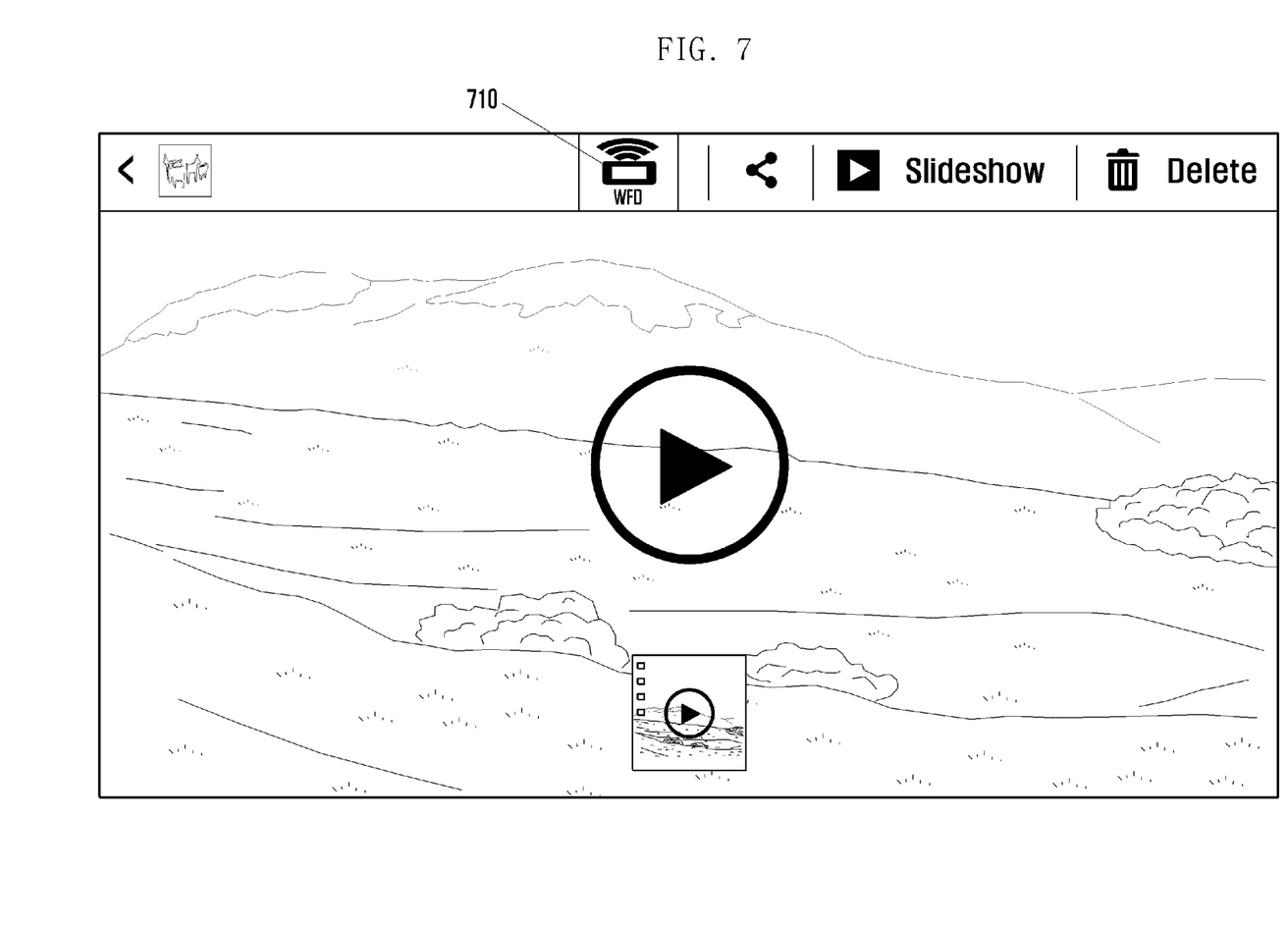
FIG. 7 illustrates a method of switching a mobile terminal into a pointer mode according to another embodiment of the present invention.

FIG. 7 illustrates a method of switching a mobile terminal into a pointer mode according to another embodiment of the present invention.

As shown in FIG. 7, the mobile terminal 100 displays a pointer control menu 710 in a predetermined area of the mobile terminal 100. The mobile terminal 100 may be switched into a pointer mode according to whether a user input for the pointer mode control menu 710 is received.

A difference between FIG. 6 and FIG. 7 is that the pointer mode control menu is displayed in the quick panel in FIG. 6, but the pointer mode control menu is displayed in a predetermined area of the mobile terminal in FIG. 7.

When switching into the pointer mode, a pointer may be generated in a predetermined area of the mobile terminal 100 and/or the external display device 110. The user then controls a movement of the pointer through a selected input.

Figure 8:
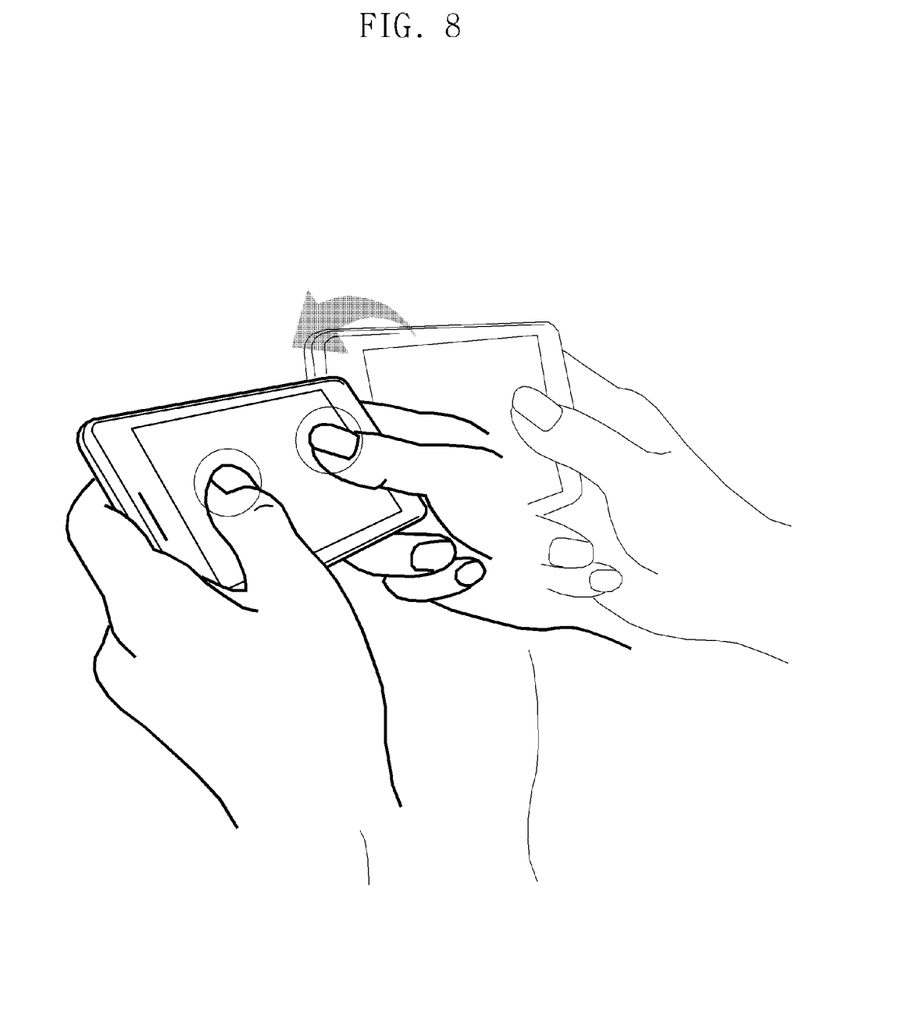
FIG. 8 illustrates a method of switching a mobile terminal into a pointer mode according to another embodiment of the present invention.

FIG. 8 illustrates a method of switching a mobile terminal into a pointer mode according to another embodiment of the present invention.

The mobile terminal 100 according to an embodiment of the present invention may detect a movement of the mobile terminal, such as through an acceleration sensor. Therefore, the mobile terminal 100 may be switched into a pointer mode, for example, when detecting a back and forth movement.

According to the present invention, a received touch input and subsequent touch operations are analyzed in the mobile terminal, so that a screen of an external display device connected to the mobile terminal can be easily controlled.

Embodiments of the present invention have been disclosed in the present specification and drawings which are used as general meanings for easily explaining the technical contents of the present invention and helping to understand the present invention, and do not limit the scope of the present invention. While the invention has been described in connection with embodiments illustrated in the drawings, a person ordinarily skilled in the art will understand that the embodiments are merely illustrative and various modified and equivalent embodiments may be made therefrom.

What is claimed is:

1. A method of processing an input of a mobile terminal, the method comprising:
   transmitting information displayed in the mobile terminal to an external display connected to the mobile terminal through a wired or wireless interface;
   receiving a first touch input;
   determining a holding time of the first touch input when receiving a second touch input following the first touch input; and
   displaying a user interface (UI) corresponding to the second touch input on screens of the mobile terminal and external display simultaneously,
   wherein:
      if the holding time of the first touch input is less than a first threshold when receiving the second touch, the displayed UI is a first UI corresponding to a first operation;
      if the holding time of the first touch input is greater than the first threshold and less than a second threshold when receiving the second touch, the displayed UI is a second UI corresponding to a second operation; and
      if the holding time of the first touch input is greater than the second threshold when receiving the second touch, the displayed UI is a third UI corresponding to a third operation; and
   wherein the second touch input comprises a flick input when the displayed UI is the first UI.

2. The method of claim 1, wherein the second touch input comprises generating and moving a pointer when the displayed UI is the second UI.

3. The method of claim 1, wherein the second touch input comprises executing a function corresponding to an item corresponding to a position of the first touch input or the second touch input when the displayed UI is the third UI.

4. The method of claim 1, wherein the second touch input includes a drag input.

5. The method of claim 1, further comprising:
   transmitting information, which reflects a result of the second touch input and is being displayed in the mobile terminal, to the external display device.

6. The method of claim 1, further comprising:
   transmitting a command for processing the second input to the external display device and displaying identical information in the mobile terminal and the external display device.

7. A mobile terminal for processing a received input, the mobile terminal comprising:
   a display unit;
   an input unit configured to receive a user input;
   wired or wireless interface unit configured to transmit information displayed in the display unit to an external display device; and
   a controller configured to control to:
      transmit information displayed in the display unit to the external display device connected to the mobile terminal through the wired or wireless interface,
      receive a first touch input through the input unit,
      determine a holding time of the first touch input when a second touch input is received following the first touch input, and
      display a user interface (UI) corresponding to the second touch input on the display unit of the mobile terminal and external display simultaneously,
   wherein:
      if the holding time of the first touch input is less than a first threshold when receiving the second touch, the displayed UI is a first UI corresponding to a first operation:
      if the holding lime of the first touch input is greater than the first threshold and less than a second threshold when receiving the second touch, the displayed UI is a second UI corresponding to a second operation: and
      if the holding time of the first touch input is greater than the second threshold when receiving the second touch, the displayed UI is a third UI corresponding to a third operation; and
   wherein the second touch input is processed as a flick input when the displayed UI is the first UI.

8. The mobile terminal of claim 7, wherein the second touch input generates and moves a pointer when the displayed UI is the second UI.

9. The mobile terminal of claim 7, wherein the second touch input comprises executing a function corresponding to an item corresponding to a position of the first touch input or the second touch input when the displayed UI is the third UI.

10. The mobile terminal of claim 7, wherein the second touch input includes a drag input.

11. The mobile terminal of claim 7, wherein information, which reflects a result of processing the second touch input and is being displayed in the mobile terminal, is transmitted via the wired or wireless interface to the external display device.

12. The mobile terminal of claim 7, wherein a command for processing the second touch input is transmitted via the wired or wireless interface to the external display device and display identical information the external display device.

* * * * *